May 5, 1959
C. J. PIPER
2,885,065
BALED HAY ELEVATOR AND DISTRIBUTOR
Filed Aug. 20, 1956
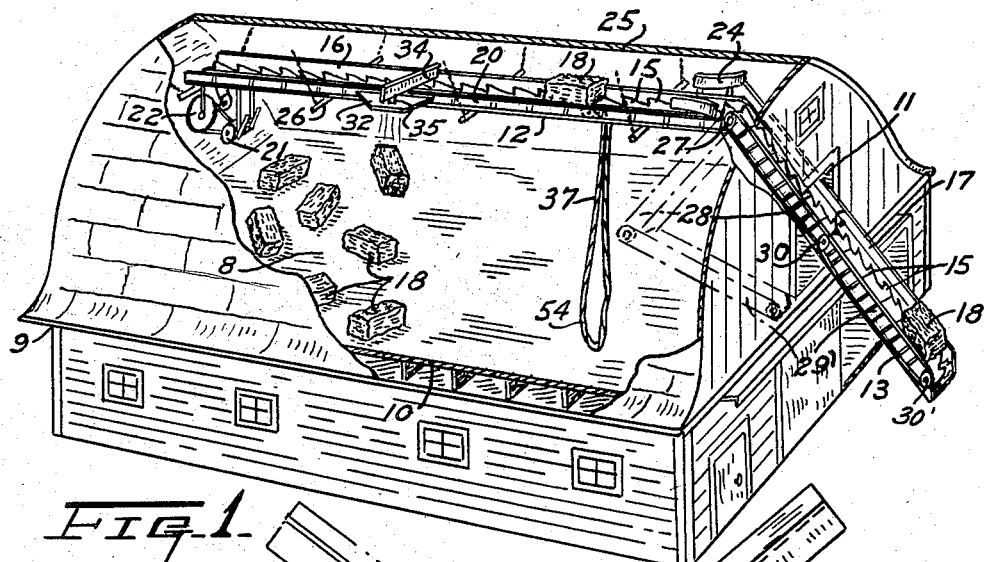
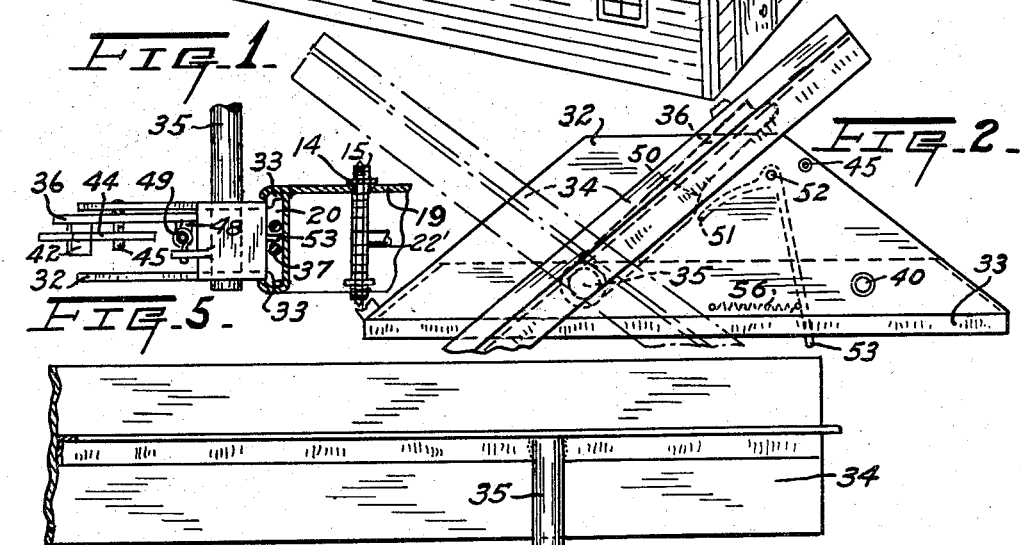
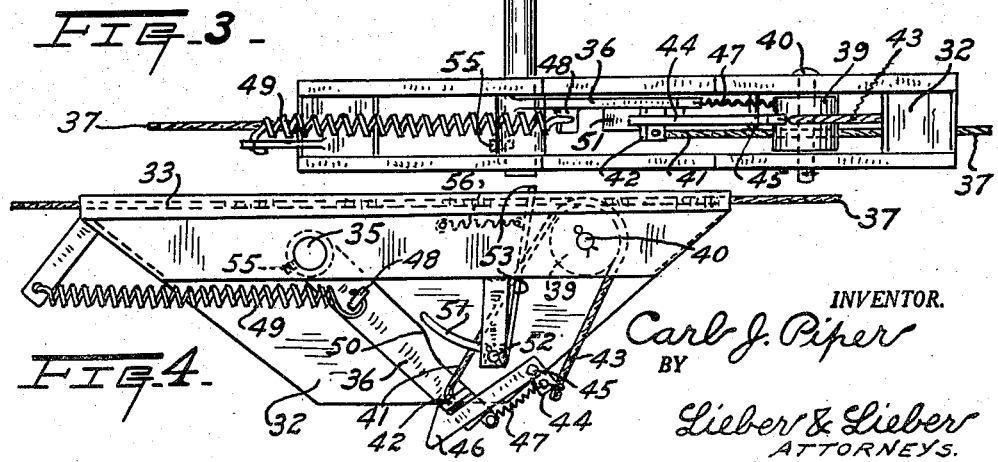
INVENTOR.
Carl J. Piper
BY
Lieber & Lieber
ATTORNEYS.

United States Patent Office 2,885,065
Patented May 5, 1959

2,885,065

BALED HAY ELEVATOR AND DISTRIBUTOR

Carl J. Piper, Watertown, Wis.

Application August 20, 1956, Serial No. 605,149

2 Claims. (Cl. 198—188)

This invention relates generally to improvements in the art of storing bulky articles such as bales of hay, cotton or the like within enclosures, and relates more specifically to improvements in the construction and operation of mechanism for elevating and selectively depositing bales of hay within storage barns or the like.

The primary object of the present invention is to provide an improved bale elevating and distribution system which is simple and readily operable and manipulable to deposit the successive bales at any desired locality within a storage space.

Some of the more important specific objects of the invention are as follows:

To provide an improved conveyor having cooperating article elevating and approximately horizontal transporting sections one of which is swingably adjustable relatively to the other and adapted to be folded into compact condition when not in use.

To provide an improved elevating and distributing device for articles such as baled hay, which is rapid in action and conveniently operable with utmost safety.

To provide an improved conveyor installation for transferring bulky articles such as bales of hay from place to place, and which can be readily manipulated to automatically deliver the successive articles to any preselected locality and on either side of a conveyor within the final destination such as a hay mow.

To provide an improved bale transfer assemblage adapted to effectively handle successive bales of diverse sizes and shapes.

To provide an improved power driven bale transporting unit which can be easily installed in a barn or other storage space without diminishing the storage capacity of the receptacle.

To provide an improved baled hay storage system of durable construction which can be readily controlled with minimum effort and attention to function with maximum efficiency and minimum power consumption.

To provide a simple and compact baled hay elevator and distributor which is operable with utmost precision, and which may be installed and operated at moderate cost.

These and other more specific objects and advantages of the invention will be apparent from the following detailed description.

A clear conception of the features constituting the present improvements and of the construction and operation of a typical commercial embodiment of the invention, may be had by referring to the drawings accompanying and forming a part of this specification wherein like reference characters designate the same or similar parts in the various views.

Fig. 1 is a perspective view of a typical barn with the roof partially broken away to reveal the hay mow, and showing one of the improved baled hay elevating and distributing systems installed therein;

Fig. 2 is an enlarged top view of one of the improved universal hay bale unloading devices alone, showing a fragment of the bale ejecting arm in one extreme position in solid lines and in its opposite extreme position in dot-and-dash lines;

Fig. 3 is a similarly enlarged side elevation of the same bale unloader looking inwardly toward the mechanism for alternately positioning the ejector arm at different angles transversely of the path of the main bale conveyor;

Fig. 4 is a likewise enlarged bottom view of the bale unloading device, also showing the ejector arm reversing mechanism, and the rocker arm for holding the unloading unit in any position along the bale conveyor; and Fig. 5 is a somewhat diagrammatic end view of the bale unloader minus its ejector arm, but showing the manner in which it slidably cooperates with the conveyor support.

While the invention has been illustrated and described herein as having been applied to a hay bale elevating and unloading system installed in a typical barn, it is not intended to restrict the use of the improved features to such an installation; and it is also contemplated that specific descriptive terms employed herein be given the broadest possible interpretation consistent with the disclosure.

Referring to the drawing, as shown in Fig. 1, the hay mow 8 of the barn 9 is provided with an extensive floor 10 and with a loading opening 11 at one end, and has therein a hay bale conveyor comprising an approximately horizontal section 12 mounted high above the floor 10 and an inclined elevator section 13 angularly adjustable relative to one end of the section 12 and extending downwardly and outwardly of the barn 9 through the ingress opening 11. The two conveyor sections 12, 13 are of the endless chain type, having chains 14 coacting with end sprockets 22 at their opposite ends and provided with cleats 15 adapted to move along their respective supports 16, 17 and to dig into the successive bales 18 of hay deposited within the paths of the conveyor sections. The upper horizontal section 12 of the bale conveyor has an elongated housing provided with a flat upper deck 19 and with a recess 20 extending along one or both of its opposite sides as shown in Figs. 1 and 5; and the upper chain section 12 is adapted to be driven by an electric motor 21 through speed reducing mechanism 22 associated with the driving sprocket 22 at one end of the section 12 the opposite end of which is drivingly connected by sprockets mounted on a pivot shaft 27 with the upper end of the elevating section 13.

The adjoining ends of the conveyor sections 12, 13 are preferably provided with bale guides 24 and the section 12 may be suspended from the roof 25 of the barn 9 by means of cross bars 26 as illustrated in Fig. 1; and the rotary shaft 27 upon which the coaxial motion transmitting sprockets between the endless conveyor sections 12, 13 are mounted also provides a pivotal mounting for the elevator section 13. This inclined elevator section 13 has two relatively foldable endless conveyors coacting with sprockets carried by the rotary shafts 27, 30, 30' which are journalled in similarly foldable trough shaped supporting and bale guiding portions 28, 29 adapted to be extended into rectilinear alinement as shown in solid lines in Fig. 1 when the conveyor is in use, and to be jack-knifed about their connecting pivot shaft 30 and swung into the hay mow 8 through the opening 11 as depicted in dot-and-dash lines when not in use. The alined portions 28, 29 can be angularly adjusted as a unit about the pivot shaft 27 to vary the inclination of the elevator, and the opening 11 should be of sufficient size to permit the folded conveyor section 13 to be swung therethrough about this same pivot shaft.

While the cleats 15 of the endless chains 14 of the cooperating conveyor sections 12, 13 are capable of elevating and advancing the successive hay bales 18 which are deposited upon the lower end of the inclined section 13, along the two sections when the motor 21 is operating, it is important that the bales 18 be ejected from the upper section 12 and deposited uniformly and at any locality throughout the entire area of the floor 10 of the hay mow 8. The improved mechanism for effecting such uniform distribution of the bales 18, comprises in general a frame 32 having parallel upper and lower guiding ridges 33 adapted to slidably engage a C-shaped recess 20 on either side of the upper deck 19; a bale ejector arm 34 mounted upon and radiating from an upright shaft 35 journalled in the frame 32 and having a lever 36 attached thereto and also radiating therefrom; and means including a cable or rope 37 for swinging the arm 34 from one angular position spanning the conveyor section 12 into another, so as to automatically deliver the bales 18 from either side of and at any point along this horizontal conveyor section 12.

The frame 32 of the bale unloader may be formed of sheet metal, and has a guiding pulley or drum 39 for the rope 37 mounted therein upon a shaft 40, and one end 41 of the rope 37 is secured to a lug 42 near the swinging end of the arm 36, while the opposite rope end 43 is attached to a latch 44 pivotally mounted on a pin 45 and which latch has a hooked end 46 urged into engagement with the lug 42 by a light tension spring 47. The lever 36 also has another lug 48 thereon which is connected to the frame 32 by a much heavier tension spring 49, and the portion of this lever 36 between the lugs 42, 48 is provided with a cam surface 50 adapted to engage one arm 51 of a bell crank which is pivoted on a pin 52 carried by the frame 32 and the other arm 53 of which is urged by a spring 56 into clamping engagement with the bottom or inner wall of the side recess 20 in the conveyor deck 19 so as to hold the unloader in any position along this deck.

The lever 36 is adjustably secured to the upright shaft 35 by a set screw 55, and the rope 37 coacts with a guiding pulley mounted on and near the opposite ends of the conveyor deck 19 and has a depending manipulating loop 54 located as near as possible relative to the bale inlet opening 11 and extending downwardly within easy reach relative to the floor 10 of the hay mow 8. The rope 37 is continuous and the guiding pulleys for this rope may be journalled within the conveyor deck 19 in an obvious manner, and as previously indicated the bale unloader may be slidably associated with either side of this deck.

When the various parts of the improved bale transporting and distributing system have been properly constructed and installed as hereinabove described, the bale ejecting unit should first be positioned near the end of the horizontal conveyor deck 19 adjacent to the drive and remote from the bale supply conveyor section 13, whereupon the electric motor 21 may be placed in operation to drive the two main conveyor sections 12, 13 and cause the cleats 15 to transport successive bales 18 upwardly along the portions 28, 29 of the elevator section 13 and horizontally along the upper horizontal deck 19 of the section 12. Depending upon the transverse angular setting of the ejector arm 34, the bales will be delivered laterally of the path of the horizontal conveyor section 12 by this arm 34 which spans this section, and will be deposited as shown in Fig. 1 into the hay mow 8 and upon the floor 10 thereof. If it becomes desirable to discontinue the transportation of hay bales 18 and to store the apparatus within the hay mow 8, the two pivotally connected portions 28, 29 of the inclined elevator section 13 may be jack-knifed and swung about the pivot 27 into the barn 9 through the bale inlet opening 11, and this opening may subsequently be closed by a door so as to entirely conceal the conveying elements.

In order to effect uniform distribution of the bales 18 throughout the entire area of the floor 10 of the hay mow 8, it is only necessary for an operator to manipulate the loop section 54 of the rope 37. A downward pull on the end 41 of the rope 37 will cause the lever 36 to swing in a counter-clockwise direction as indicated in Fig. 4 and will thereby bring the cam portion 50 into engagement with the arm 51 of the bell crank which is mounted upon the pivot 52 and will thereby cause the arm 53 to swing clockwise and disengage the bottom or inner wall of the recess 20 in the housing 19 of the upper conveyor section 12. This releasing of the arm 53 will permit the ejector unit to be moved toward the bale supply opening 11 to any position along the upper conveyor section 12 by merely continuing such pull, and when the pull on the rope end 41 is released, the arm 53 of the bell crank will be swung by the spring 56 into clamping engagement with the bottom of the recess 20 and will thereby positively hold the unit in adjusted position. This positioning of the unloading unit at any location throughout the entire length of the upper conveyor section 12 is of extreme importance since it permits the operator to eject bales 18 so as to obtain most uniform distribution of the bales throughout the entire area of the floor 10.

In order to cause the ejector arm 34 to swing from one extreme angular position across the path of the conveyor section 12 to the other, it is only necessary for the operator to manipulate the loop 54 of the rope 37 so as to exert a pull on the rope end 43. This will release the latch 44 and permits the large spring 49 to pull the lever 36 in a clockwise direction as viewed in Fig. 4 and to thereby swing the arm 34 from the position shown in solid lines in Fig. 2 to that illustrated in dot-and-dash lines. In order to return the lever 36 and the arm 34 to the position shown in solid lines, it is only necessary for the operator to exert a pull on the opposite rope end 41 and to continue this pull until the latch 44 again becomes effective to hold the lever 36 in the position illustrated in Fig. 4.

From the foregoing detailed description it will be apparent that the present invention in fact provides a simple but highly effective installation for elevating and distributing bales 18 uniformly throughout the entire area of the floor 10. The improved device is constructed so that the elevator section 13 may be swung to any desired angle relative to the horizontal section 12 and may also be readily collapsed and housed within the hay mow 8. The improved automatic unloader may be conveniently adjusted along the upper horizontal conveyor deck 19 and locked in position with the aid of the same rope element that is utilized to swing the arm 34 from one extreme angular position to the other, and the position of the arm supporting shaft 35 relative to the lever 36 may be readily varied by manipulation of the clamping set screw 55 associated with the hub of this lever. The rope 37 may be readily guided upon sheaves associated with the deck 19 of the upper conveyor section in an obvious manner, so as to properly transmit the pulls applied to the loop 54. The improved assemblage has gone into highly satisfactory and successful commercial use, and can be manufactured and installed as well as operated at moderate cost.

It should be understood that it is not desired to limit this invention to the exact details of construction and to the precise mode of operation of the baled hay conveying and distributing unit herein specifically shown and described, for various modifications within the scope of the amended claims may occur to persons skilled in the art.

I claim:

1. A bale conveying system comprising, a conveyor having an approximately horizontal bale transporting section, a bale ejector carriage adjustable along said conveyor section and having thereon an ejector arm swingable from one side to the other and transversely across said conveyor section to effect delivery of bales at any point throughout the length of said section, and means for moving and for holding said ejector carriage in any desired position along said conveyor section, said means also being operable so as to cause said ejector arm to deliver bales from either side of said conveyor section.

2. A bale conveying system comprising, a conveyor having an approximately horizontal bale transporting section, a bale ejector carriage adjustable along said conveyor section, an ejector arm swingable from one side to the other and extending at an oblique angle transversely across the path of said conveyor section above said ejector carriage, and a single rope assemblage cooperating with said ejector carriage and being manipulable to move and lock the carriage in any desired position along said conveyor section, said rope assemblage also being manipulable to swing said ejector arm so as to cause the latter to alternately deliver bales from either side of said conveyor section.

References Cited in the file of this patent

UNITED STATES PATENTS

| | | |
|---|---|---|
| 230,144 | Merry | July 20, 1880 |
| 480,490 | Cribb | Aug. 9, 1892 |
| 486,346 | Lammedee | Nov. 15, 1892 |
| 2,134,948 | Lienau et al. | Nov. 1, 1938 |
| 2,569,011 | Laprise | Sept. 25, 1951 |
| 2,639,024 | Kneer | May 19, 1953 |